United States Patent [19]
Ezure et al.

[11] Patent Number: 4,890,822
[45] Date of Patent: Jan. 2, 1990

[54] CAR SUSPENSION SYSTEM

[75] Inventors: Nobuya Ezure, Zama; Ichiro Takadera, Tokyo; Kohei Taguchi, Yokahama, all of Japan

[73] Assignee: NHK Spring Co., Ltd., Tokyo, Japan

[21] Appl. No.: 253,887

[22] Filed: Oct. 6, 1988

Related U.S. Application Data

[63] Continuation-in-part of Ser. No. 010,336, Feb. 3, 1987, abandoned.

[30] Foreign Application Priority Data

Feb. 13, 1986 [JP] Japan .................. 61-18184[U]
Sep. 19, 1986 [JP] Japan .................. 61-221348

[51] Int. Cl.$^4$ ............... F16F 9/04; F16F 9/43; F16F 5/00; F01B 19/00
[52] U.S. Cl. ................. 267/64.24; 267/64.27; 267/64.28; 267/123; 188/318; 188/322.21; 92/48
[58] Field of Search ........... 188/314, 315, 318, 322.21, 188/299; 267/64.23, 64.13, 64.19, 64.27, 64.28, 122, 123; 92/103 F, 103 R, 103 SD, 103 M, 47, 48

[56] References Cited

U.S. PATENT DOCUMENTS

| | | | |
|---|---|---|---|
| 2,186,183 | 1/1940 | Trumbull | 92/103 S D |
| 2,867,241 | 1/1959 | Harris | 92/103 S D |
| 2,948,223 | 8/1960 | Mashinter | 92/103 S D |
| 3,321,200 | 5/1967 | Polhemus et al. | 92/103 R X |
| 3,397,621 | 8/1968 | Groves | 92/48 |
| 4,241,816 | 12/1980 | Hubrecht et al. | 198/314 X |
| 4,311,302 | 1/1982 | Heyer et al. | 267/64.23 |
| 4,614,255 | 9/1986 | Morita et al. | 188/315 |

FOREIGN PATENT DOCUMENTS

| | | | |
|---|---|---|---|
| 2936366 | 3/1987 | Fed. Rep. of Germany | 267/64.28 |
| 1512209 | 2/1968 | France | 267/64.23 |
| 2503055 | 10/1982 | France | 267/64.13 |
| 0996768 | 2/1983 | U.S.S.R. | 267/64.23 |

Primary Examiner—Douglas C. Butler
Assistant Examiner—Richard Potosnak
Attorney, Agent, or Firm—Frishauf, Holtz, Goodman & Woodward

[57] ABSTRACT

A suspension system according to the present invention comprises a cylinder assembly, which includes a cylinder and a rod fitted therein for axial reciprocation. An oil chamber containing oil and a gas chamber containing gas are defined inside the cylinder assembly. A damping-force generating mechanism is provided in the oil chamber, whereby a damping force is applied to the reciprocation of the rod. A bellows is contained in the cylinder assembly. The bellows includes an oil-resistant body made of an elastomer, and a gas-barrier film made of a material impermeable to gas and formed on the surface of the body. The oil and gas chambers are isolated completely from each other by the bellows.

14 Claims, 6 Drawing Sheets

CAR SUSPENSION SYSTEM

This application is a continuation-in-part, of application Ser. No. 07/010/336, filed Feb. 3, 1987, now abandoned.

BACKGROUND OF THE INVENTION

The present invention relates to a suspension system adapted to be arranged between members located on the body side and wheel side of an automobile, and more specifically, to an improvement in a car suspension system having an oil chamber and a gas chamber therein.

Prior art suspension systems, which are adapted to contain oil and gas, comprise a cylinder housing and a rod fitted therein. A gas chamber and an oil chamber are defined inside the cylinder housing. Compressed gas, such as nitrogen, is sealed in the gas chamber. The repulsive force of the gas acts as a gas spring mechanism. Damping-force generating means is provided inside the cylinder housing. The oil in the oil chamber is subjected to viscous resistance as it passes through the generating means, so that reciprocation of the rod is damped.

In this type of conventional suspension systems, a free piston is arranged between the oil and gas chambers, in order to prevent the gas from leaking from the gas chamber and being absorbed by the oil in the oil chamber. However, in systems which use a free piston, considerable frictional resistance is produced at the outer peripheral portion of the piston, as the piston moves. Moreover, the gas in the gas chamber is liable to leak out into the liquid chamber, through the peripheral portion of the piston. Therefore, it is difficult to completely prevent the gas from being absorbed by the oil.

As disclosed in U.S. Pat. No. 3,469,661 or 3,587,789, a suspension system has been proposed which uses a flexible cylindrical partition member. However, this partition member cannot satisfactorily prevent the gas from leaking from the gas chamber into the oil chamber. Therefore, prolonged use of the system may possibly cause a partial gas leak to occur, which would result in a reduction in the capacity of the gas chamber. If the gas chamber capacity lessens in this manner, the spring constant of the system will increase. Thus, if the system is used in an automobile, the vehicle becomes less comfortable to ride in, and its ride height will become lowered. To avoid this drawback, the gas chamber inside the cylinder housing must then be replenished with additional gas. Performing this replenishment, however, is difficult and time consuming.

SUMMARY OF THE INVENTION

Accordingly, an object of the present invention is to provide a car suspension system, in which gas confined in a gas chamber within the system can be prevented from leaking into and being absorbed by oil in an adjacent oil chamber. Another object of the invention is to improve the durability of a member for dividing the oil and gas chambers, and to provide a gas spring apparatus, which does not produce the substantial frictional resistance which arises when a free piston is used.

In order to achieve the above objects of the present invention, there is provided a car suspension system which comprises a cylinder assembly including at least one cylinder housing and a rod, the rod being fitted in the cylinder housing and movable in the axial direction thereof, the cylinder assembly further including an oil chamber for containing oil and a gas chamber for containing gas; damping-force generating means arranged inside the cylinder assembly, and adapted to damp reciprocation of the rod by utilizing viscous resistance, produced when the oil in the oil chamber is circulated; and a bellows located between the oil chamber and the gas chamber, and capable of extending and contracting in the axial direction of the cylinder housing, the bellows including an oil-resistant body made of an elastomer, and a gas-barrier film made of a material impermeable to gas, and formed on the inner and/or outer surface of the body, the film separating the oil chamber from the gas chamber.

In the suspension system constructed in this manner, if the rod moves in its contracting direction, relative to the cylinder housing, the gas in the cylinder assembly is compressed. As a result, the capacity of the gas chamber is reduced, so that the gas in the gas chamber increases its repulsive force. If, on the other hand, the rod moves in its extending direction, the capacity of the gas chamber increases, resulting in the weakening of the repulsive force of the gas therein.

Thus, as the cylinder housing and the rod reciprocate relatively in the axial direction, the capacity of the gas chamber varies, causing the bellows to extend and contract axially. By so doing, the bellows can easily alter its internal capacity. The gas-barrier film constituting the bellows can securely prevent the gas from leaking from the gas chamber and into the oil in the oil chamber. Without the need to replenish the gas chamber, therefore, the spring characteristic and the ride comfort of the car can be kept constant for a long time. The gas-barrier film is formed on the flexible elastomer body. While the bellows is extending or contracting, in this arrangement, the film alters its shape stably, and can bent, but never sharply. Therefore, even after repeatedly bent, the gas-barrier film will neither crack nor lower in its mechanical strength, thus ensuring high durability of the film. In extending and contracting, moreover, the bellows never produces the substantial frictional resistance as occurs through the movement of a free piston.

DETAILED DESCRIPTION OF THE PREFERRED EMBODIMENTS

Figure 1:
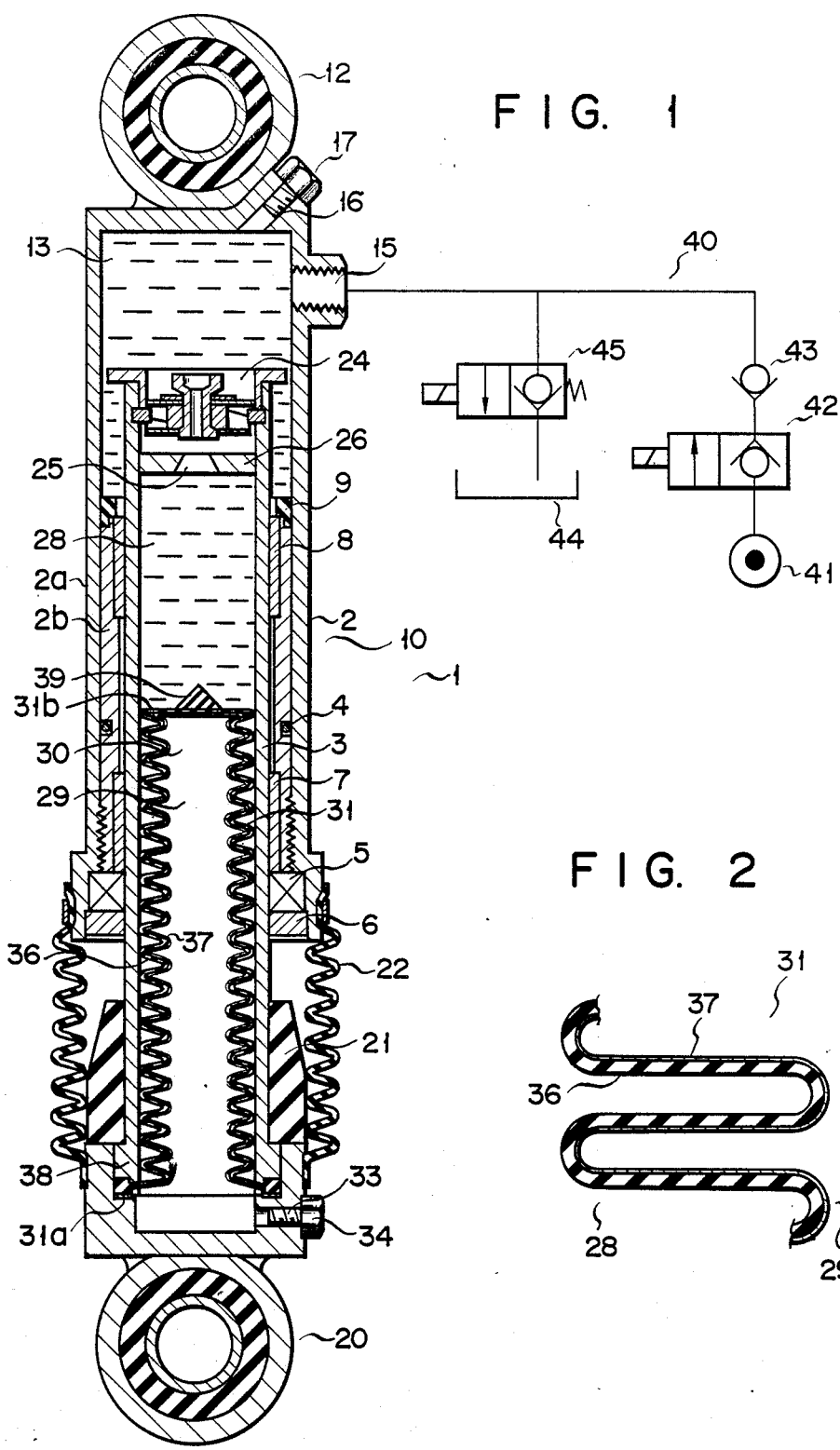
FIG. 1 is a longitudinal sectional view of a suspension system according to a first embodiment of the present invention.

FIG. 1 shows a first embodiment of the present invention. As is shown in FIG. 1, car suspension system 1 comprises cylinder housing 2 and hollow rod 3. Rod 3, having the shape of a hollow cylinder, is fitted in housing 2, and can reciprocate along the axis of housing 2.

Cylinder housing 2 includes cylindrical first member 2a and cylindrical second member 2b fitted therein. Sealing member 4 is interposed between first and second members 2a and 2b. Mechanical seal 5, seal retainer 6, and sliding bearing 7 are attached to the lower end portion of second member 2b. Sliding bearing 8 and rebound rubber 9 are attached to the upper end portion of member 2b. Housing 2 and rod 3 constitute cylinder assembly 10.

Coupling member 12 is mounted on the upper end of cylinder housing 2. Housing 2 is connected to a member (not shown) on the car-body side, by means of the coupling member. Oil chamber 13 is defined inside housing 2, and it is filled with oil. Oil port 15 in housing 2 connects with chamber 13. Hydraulic unit 40 (mentioned later) is connected to port 15. Cylinder housing 2 is formed with air-escape hole 16, through which air escapes from oil chamber 13 when oil is injected into chamber 13. Hole 16 is closed by blind plug 17.

Coupling member 20 and rubber bumper 21 are attached to one end portion of hollow rod 3. Dust cover 22 is positioned between the outer end of rod 3 and cylinder housing 2. Cover 22 surrounds a sliding surface of rod 3 which protrudes from housing 2. Damping-force generating mechanism 24 is attached to the other end portion of rod 3, and includes conventional plate valves. Inside rod 3, ring-shaped stopper 26, having oil passage port 25, is fixed in the vicinity of mechanism 24.

Oil chamber 28 and gas chamber 29 are arranged in hollow rod 3. Chamber 28 communicates with oil chamber 13 of cylinder housing 2 by means of damping-force generating mechanism 24. An inert gas, such as compressed nitrogen, is sealed in chamber 29.

Bellows 31 is housed in hollow rod 3, and separates oil chamber 28 and gas chamber 29. In this embodiment, the internal space of bellows 31 serves as gas chamber 29. The gas is fed into chamber 29 through gas-supply port 33. Port 33 is closed by blind plug 34. Bellows 31 is coaxial with cylinder housing 2, and can extend or contract in the axial direction of housing 2 and rod 3.

Figure 2:
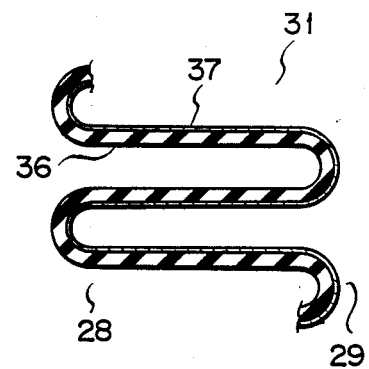
FIG. 2 is an enlarged view showing part of a bellows shown in FIG. 1.

Since oil chamber 28 is defined outside bellows 31, the bellows must not swell or deteriorate in its physical properties, even if it comes into contact with hot oil. As is shown in the enlarged view of FIG. 2, bellows 31 includes elastomer body 36 located on the oil-chamber side, and metallic gas-barrier film 37 on the gas-chamber side. The complete inner surface of body 36 is coated with film 37. Body 36 is formed of an elastomer having a low modulus of bending elasticity, and which can maintain its flexibility even at a temperature as low as around −40° C. In addition, body 36 is expected to have good resistance to wear, and must not deteriorate in its properties, even if it comes into contact with hot oil, at a temperature of 90° C. or thereabout. The elastomer used as the material of body 36 may be a polyurethane elastomer, a polyester elastomer, a polyamide elastomer, polyvinylidene chloride, or nylon, for example. The thickness of body 36 ranges from about 0.1 mm to −5.0 mm, and that of film 37 from about $3 \times 10^{-5}$ mm to $5 \times 10^{-2}$ mm.

Film 37 is formed by coating the inside surface of body 36 with metal, for example, aluminum or copper. Plating or vacuum evaporation are among the methods which may be used for the film coating. Instead of being provided on the inside of body 36, film 37 may be formed on the outside or both the inside and outside of the body. In some cases, film 37 may be formed on part of body 36, as required. Open end 31a of bellows 1 is fixed to bellows fixing base 38 of cylinder housing 2.

Lid 39 is attached to the closed-end side of bellows 31, facing passage port 25 of stopper 26. The lid can be formed, for example, of the same material as used for body 36, i.e., an elastomer. Also, lid 39 is shaped (for example, a conical shape) so that it can be fitted in port 25, in a liquid-tight manner. The lid engages port 25 when bellows 31 extends to its full length.

A suitable quantity of oil is stored in advance in oil chamber 28, before the gas is sealed inside gas chamber 29. Compressed gas is fed, through gas supply port 33, into chamber 29, thereby increasing the gas pressure therein, and causing bellows 31 to extend in the axial direction. Eventually, lid 39 reaches stopper 26, and engages passage port 25. In this state, the oil is confined between the outer peripheral surface of bellows 31 and the inner peripheral surface of hollow rod 3. Since the oil is practically noncompressive, the outer peripheral surface of bellows 31 is supported evenly by the oil. Although bellows 31 has a complicated configuration, it can be prevented from being abnormally deformed or subjected to unreasonable local stress.

Hydraulic unit 40 includes hydraulic source 41. Arranged between source 41 and oil port 15 are check valve 43 and solenoid-operated valve 42 for lifting the body of a car. Solenoid-operated valve 45 for lowering the body of a car is located between oil tank 44 and port 15.

The operation of suspension system 1, constructed in this manner, will now be described.

If rod 3 is pushed into cylinder housing 2, some of the oil in oil chamber 13 flows into oil chamber 28 of rod 3, via damping-force generating mechanism 24. As the oil flows through mechanism 24 in this manner, the motion of rod 3 is damped by the viscous resistance of the oil. At the same time, the gas in gas chamber 29 is compressed in accordance with the depth of depression of rod 3. Accordingly, the capacity of chamber 29 is reduced, so that bellows 31 contracts, and the repulsive force of the gas increases.

If, on the other hand, rod 3 moves such that it extends out from cylinder housing 2, some of the oil in oil chamber 28 then flows into oil chamber 13 of housing 2, via mechanism 24. Also, as in the previous case, the motion of rod 3 is damped by the viscous resistance of the oil. In response to the movement of rod 3, moreover, gas chamber 29 increases in its capacity, so that bellows 31 extends.

Thus, as rod 3 repeatedly extends and contracts relative to cylinder housing 2, suspension system 1 serves both as a shock absorber and a gas spring. If solenoid-operated valve 42 for lifting the body of the car is opened, the oil from hydraulic source 41 is fed into oil chamber 13. In his case, rod 3 is moved hydraulically so as to extend out from cylinder housing 2, thereby raising the ride height of the car. If, on the other hand, valve 45 for lowering the body of the car is opened, with valve 42 closed, the oil in oil chamber 13 is returned to tank 44. In this case, the ride height of the car decreases.

According to this embodiment, bellows 31 includes highly gas-impermeable film 37 and flexible, oil-resistant elastomer body 36, as mentioned before. Although bellows 31 extends or contracts, film 37 can neither bend sharply nor be deformed into an abnormal shape. Thus, film 37 is prevented from cracking and from losing its mechanical strength. The gas in gas chamber 29 is isolated completely from the oil in oil chamber 6, by film 37.

Film 37 may be provided on each of the outer and inner surfaces of body 36. Alternatively, film 37 may be provided on both the inside and outside surface of body 36.

Figure 3:
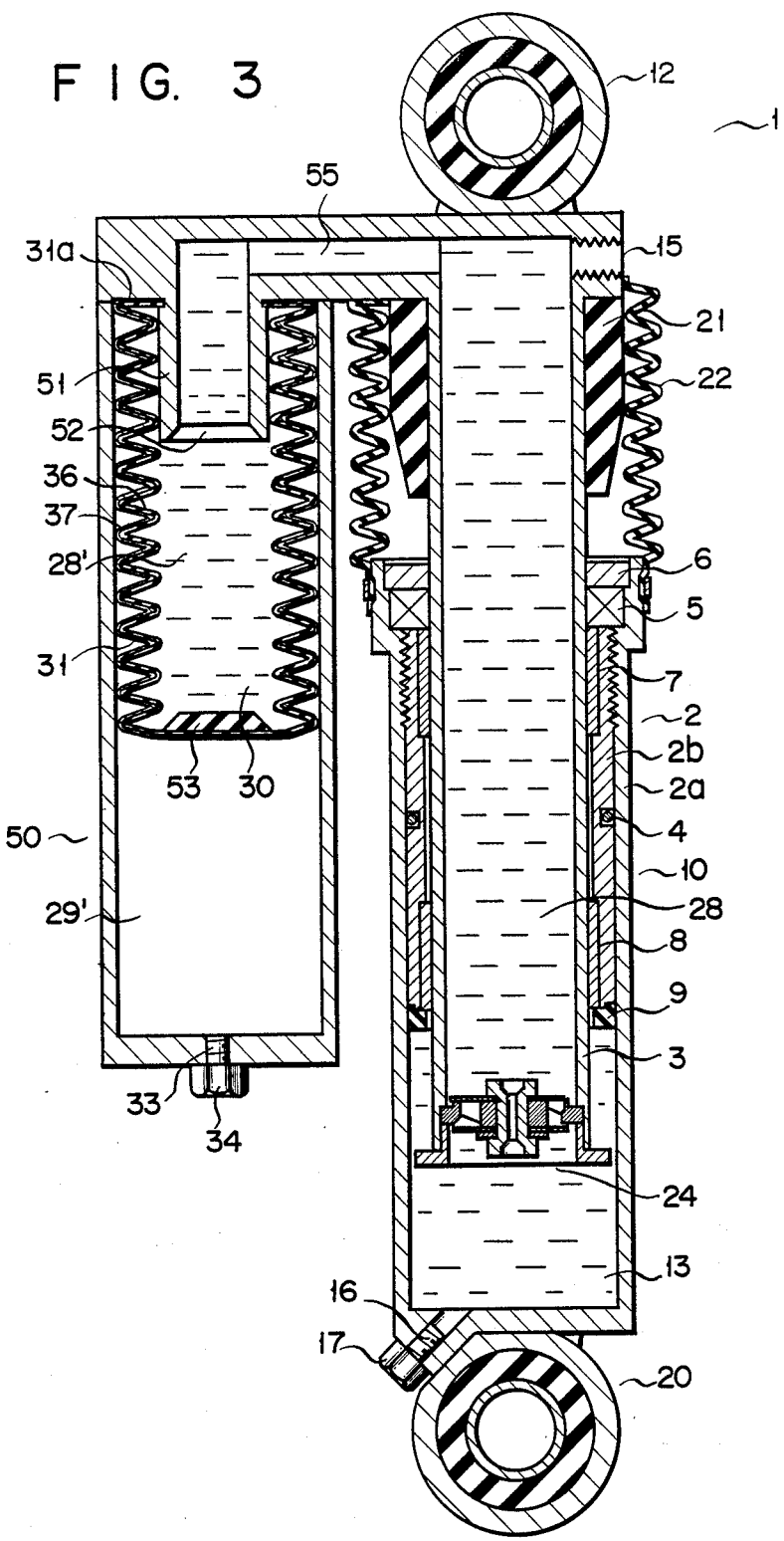
FIG. 3 is a longitudinal sectional view of a suspension system according to a second embodiment of the invention.

FIG. 3 shows a second embodiment of the present invention. In suspension system 1 of this embodiment, in contrast with the system of the first embodiment, hollow rod 3 is located above cylinder housing 2. System 1 comprises second cylinder housing 50, in addition to first cylinder housing 2. In the following description of the second embodiment, like reference numerals are used to designate like portions as in the first embodiment, for simplicity of illustration. Only differences between the two embodiments will now be described specifically.

Oil chamber 28' and gas chamber 29' are arranged in second cylinder housing 50. The two chambers are divided by bellows 31. In the second embodiment, chambers 28' and 29' are defined inside and outside bellows 31, respectively. Thus, oil-resistant elastomer body 36 is located inside bellows 31. Plastic gas barrier film 37 is formed on the outer surface of body 36. Cylindrical stopper 51, having oil passage port 52, is positioned inside bellows 31. Oil chamber 28' communicates with oil chamber 28 in hollow rod 3, by method of oil passage 55. Port 15 is connected with hydraulic unit 40 of the same type as is shown in FIG. 1.

In the second embodiment, lid 53 is attached to the inside of the closed end of bellows 31, facing passage port 52 of stopper 51. The lid is shaped so that it can be fitted in port 52, in a liquid-tight manner. If bellows 31 contracts to its full length when compressed gas is supplied through gas-supply port 33, lid 53 engages port 52. Thus, during the supply of the gas, oil is confined between the inner surface of bellows 31 and the outer surface of stopper 51.

In the second embodiment, furthermore, when rod 3 reciprocates in the axial direction, relative to first cylinder housing 2, oil in oil chamber 28 inside rod 3 flows, through oil passage 55, into or out of oil chamber 28' inside second cylinder housing 50. As rod 3 reciprocates, moreover, some of the oil flows through damping-force generating mechanism 24, thereby changing the capacity of gas chamber 29'. Accordingly, bellows 31 extends and contracts in the axial direction.

Figure 4:
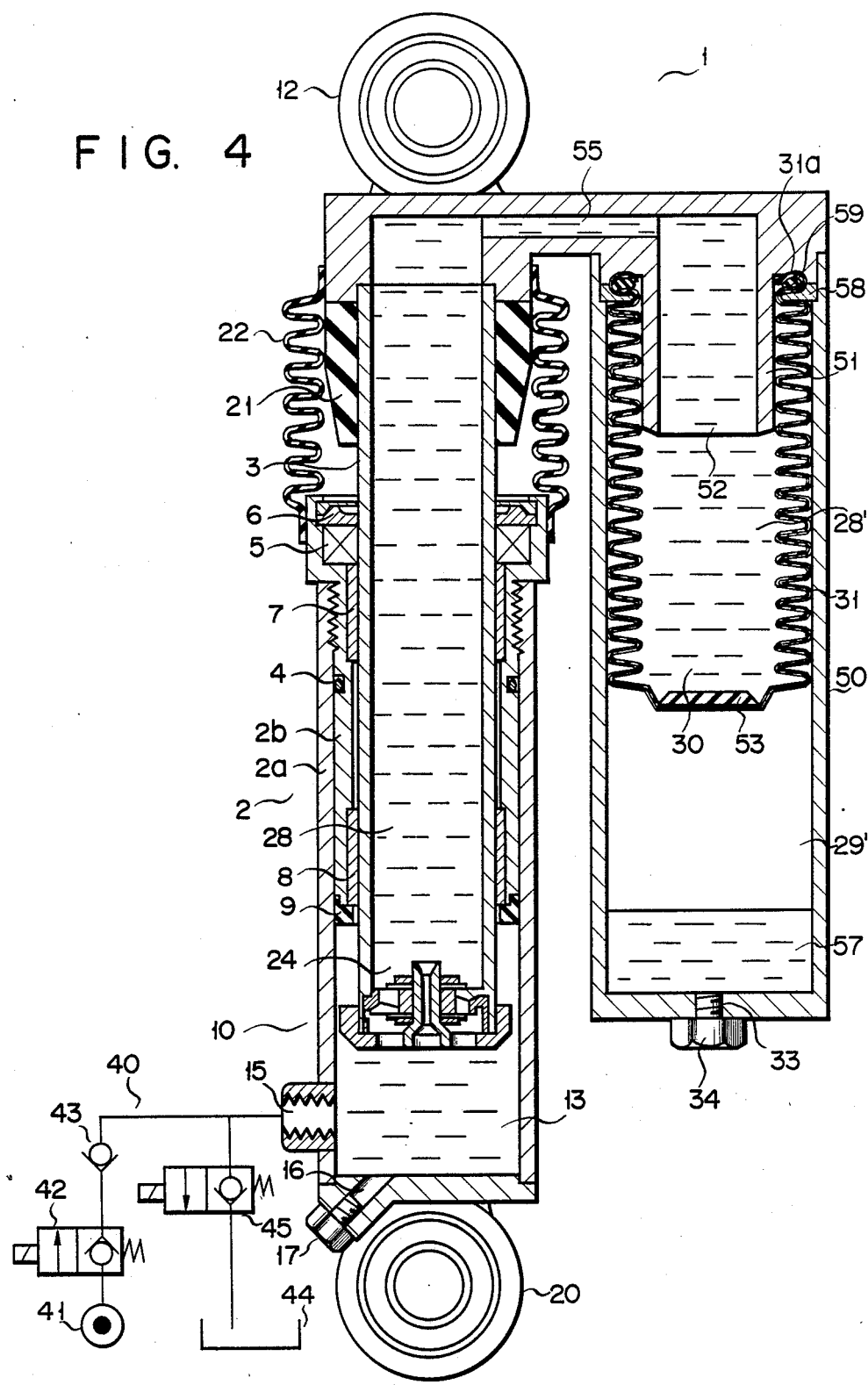
FIG. 4 is a longitudinal sectional view of a suspension system according to a third embodiment of the invention.

FIG. 4 shows a third embodiment of the present invention. In this embodiment, a suitable quantity of liquid 57 is contained in gas chamber 29', whereby the capacity of chamber 29' is adjusted. End portion 31a of bellows 31 is fixed to an end portion of cylinder housing 50, by means of bellows mounting ring 58. O-ring 59 which serves as a seal, is provided on the inside of end portion 31a of bellows 31.

Figure 5:
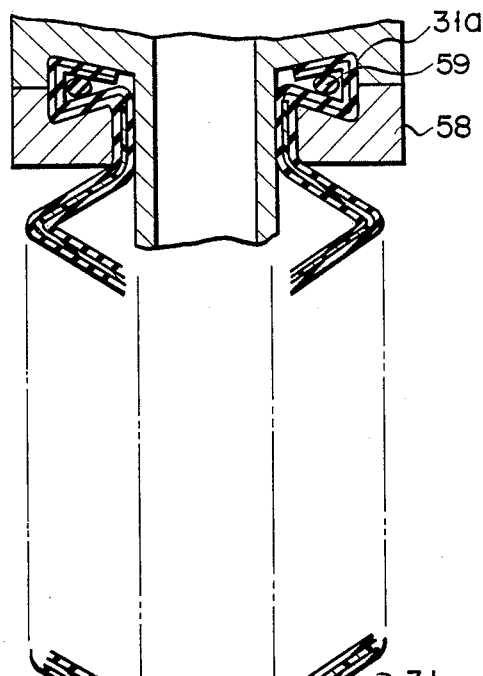
FIG. 5 is a sectional view showing a modification of a bellows of the suspension system shown in FIG. 4.
Figure 6:
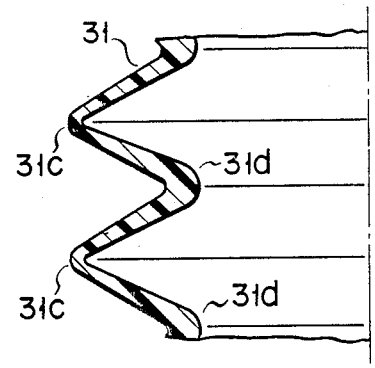
FIG. 6 is a sectional view showing another modification of the bellows.
Figure 7:
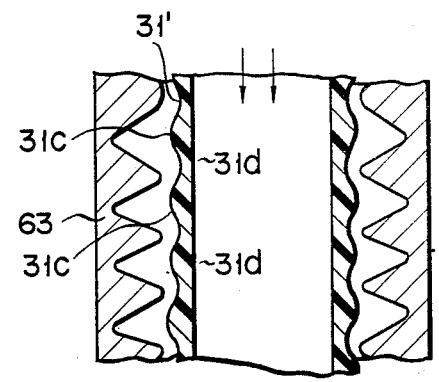
FIG. 7 is a sectional view showing the material of the bellows and part of a molding die assembly.

FIG. 5 shows a modification of bellows 31. Reinforcing member 61 is attached to closed end 31b of bellows 31, whereby end 31b is reinforced. Bellows 31 includes elastomer body 36 with plastic gas-barrier film 62 attached thereto. Film 62 is formed of a synthetic resin whose permeability to nitrogen gas is $1.0 \times 10^{-12}$ cc.cm/cm$^2$.sec.cm.Hg or less. The synthetic resin used as the material of film 62 may be an ethylene-vinyl alcohol copolymer, a polyamide, an acrylonitrile, polyvinyl chloride, polyvinylidene chloride, or any other high-molecular compounds containing any of these substances. The thickness of film 62 is 200 μm or less, preferably 20 to 50 μm. As is shown in FIG. 6, bellows 31 may be formed only of the aforesaid synthetic resin. Body 36 is formed of the same elastomer as is used for body 36 of the first embodiment.

Bellows 31 is formed by the conventional blow-molding method. If the wall thickness of the material of bellows 31 is uniform, with respect to the axial direction, before the blow-molding, large-diameter portions 31c become thinner than small-diameter portions 31d (shown in FIG. 6), after completion of the molding. Portions 31c, which are to be in sliding contact with the inner peripheral surface of cylinder housing 50, should not be too thin. To attain this, bellows material 31' is preformed so that its regions which will form large-diameter portions 31c are thicker than those regions which will form small-diameter portions 31d. Compressed air is blown into the interior space of material 31', so that the material is pressed against molding die assembly 63. Thus, a bellows 31 having a uniform wall thickness is obtained.

As has been mentioned previously, bellows 31 includes highly gas-impermeable plastic film 62 with flexible elastomer body 36 attached thereto. Although bellows 31 extends or contracts, film 62 can neither bend sharply nor be deformed into an abnormal shape. Thus, film 62 is prevented from cracking and from losing its mechanical strength.

Figure 8:
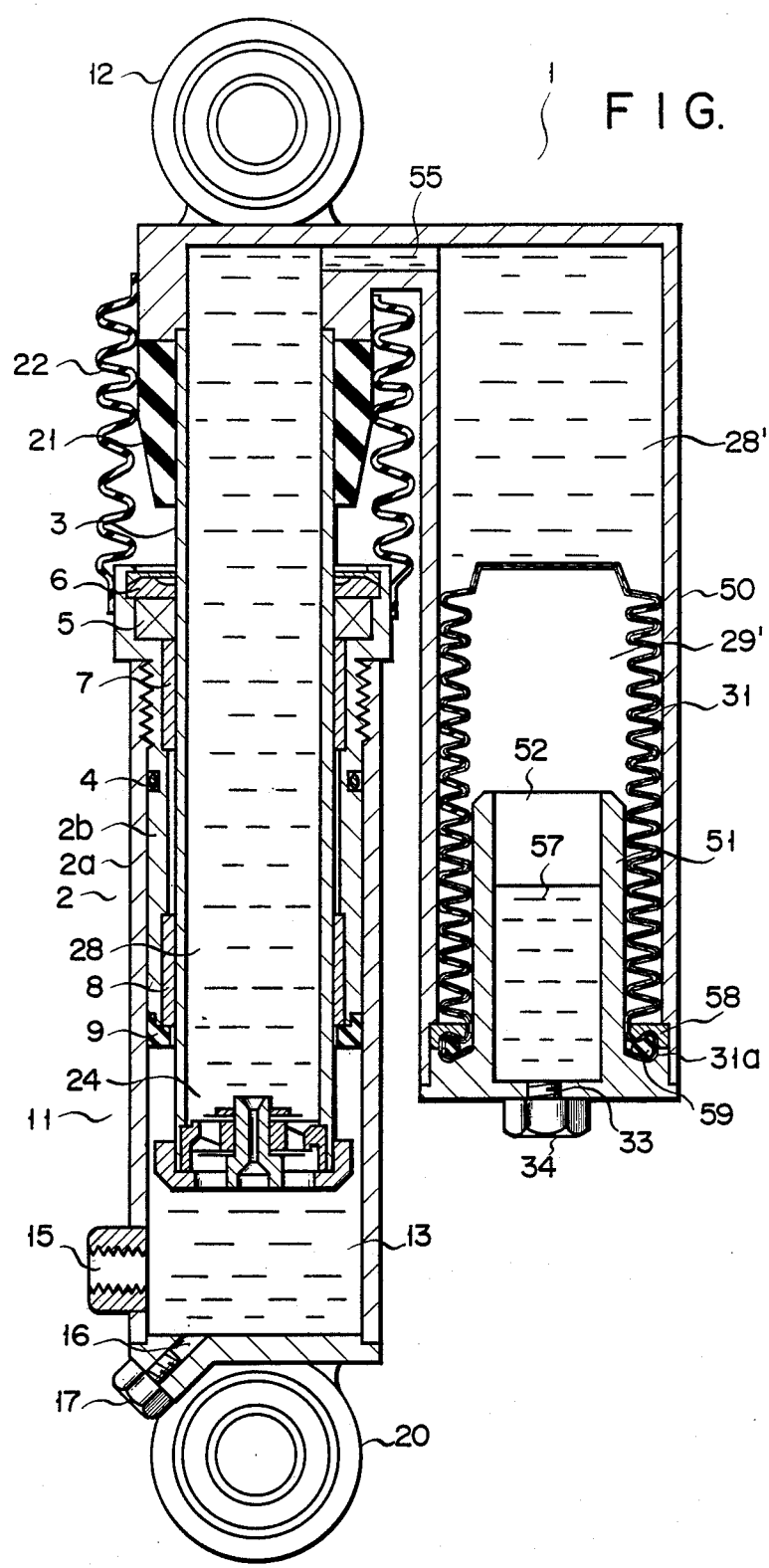
FIG. 8 is a longitudinal sectional view of a suspension system according to a fourth embodiment of the invention.

FIG. 8 shows a fourth embodiment of the present invention. In this embodiment, bellows 31 and stopper 51 are inverted, as compared with the arrangement of the third embodiment shown in FIG. 4. Gas chamber 29' and oil chamber 28' are defined inside and outside bellows 31, respectively. Since the third and fourth embodiments have substantially the same construction, like reference numerals are used to designate like portions in the two embodiments, for simplicity of illustration.

Figure 9:
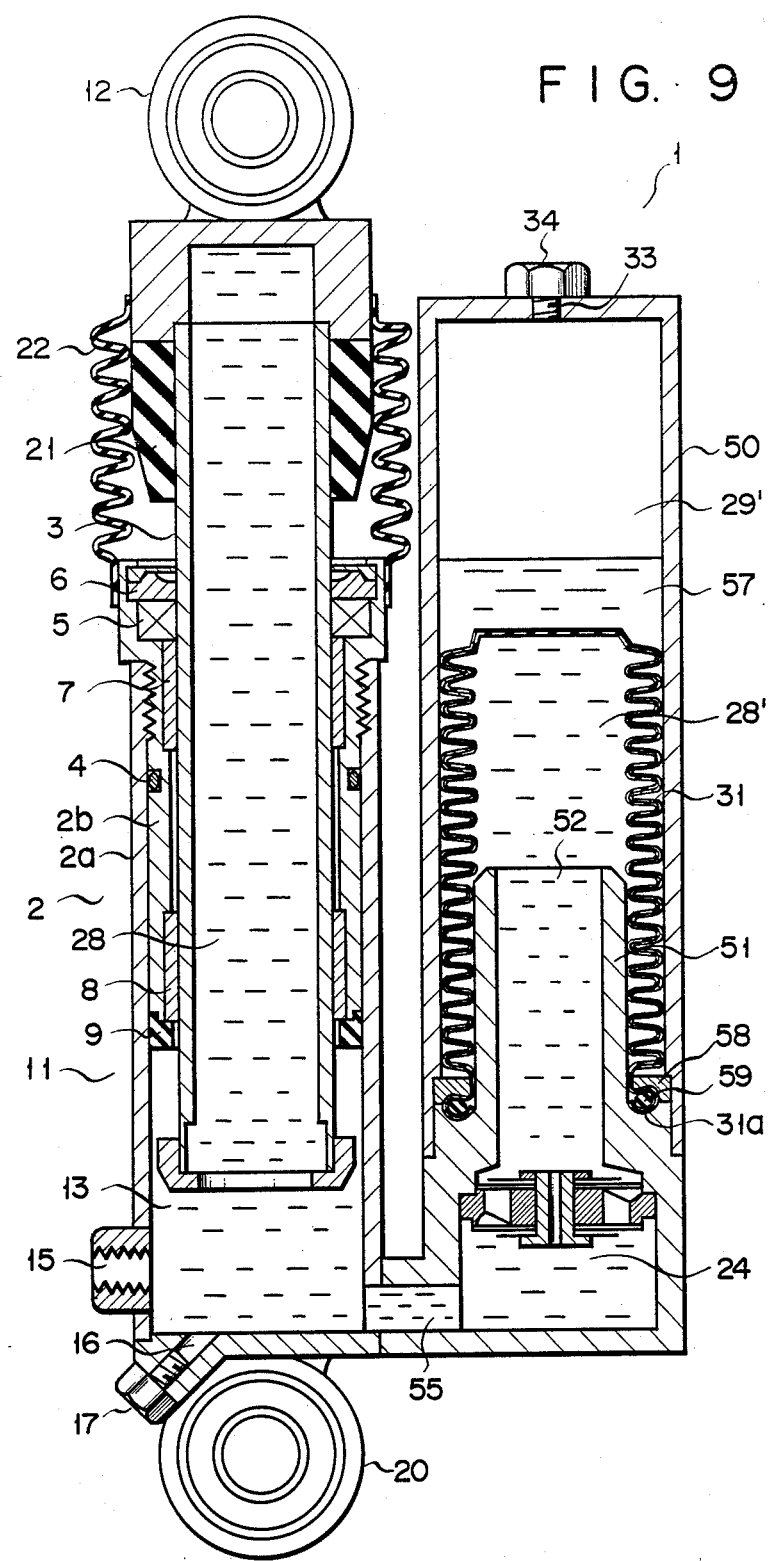
FIG. 9 is a longitudinal sectional view of a suspension system according to a fifth embodiment of the invention.

FIG. 9 shows a fifth embodiment of the present invention. In this embodiment, second cylinder housing 50 is inverted, as compared with the arrangement of the third embodiment shown in FIG. 4. Damping-force generating mechanism 24 is provided inside housing 50. Oil passage 55 is located between oil chamber 13 in first cylinder housing 2 and oil chamber 28' in housing 50.

In the fifth embodiment constructed in this manner, when rod 3 moves in the axial direction, relative to first cylinder housing 2, oil flows between oil chambers 13 and 28', via damping-force generating mechanism 42. As the oil flows in this manner, the capacity of gas chamber 29' changes, causing bellows 31 to extend and contract in the axial direction of second cylinder housing 50. As regards other portions, the fifth embodiment has the same arrangement and functions as the third or fourth embodiment.

What is claimed is:
1. A suspension system comprising:
a cylinder assembly including at least one cylinder housing and a rod, said rod being fitted in said at least one cylinder housing and being movable in the axial direction of said at least one cylinder housing, said cylinder assembly further including an oil chamber for containing oil and a gas chamber for containing gas;

damping-force generating means arranged inside said cylinder assembly, and adapted to damp reciprocation of said rod by utilizing viscous resistance, produced when the oil in said oil chamber is circulated; and a multi-layered bellows located between said oil chamber and said gas chamber, and being capable of extending and contracting in the axial direction of said cylinder housing, said bellows including a first layer comprising an oil-resistant body made of a soft, flexible elastomer, and a second layer comprising a gas-barrier film made of a synthetic resin impermeable to said gas in said gas chamber, said elastomer body being located on that side of said bellows which is in contact with the oil in said oil chamber, and said gas-barrier film being harder and thinner than said elastomer body and being coated on the opposite side of said elastomer body so as to be out of contact with said oil and in contact with said gas in said gas chamber, said elastomer body and said gas-barrier film separating the oil of said oil chamber from said gas of said gas chamber.

2. The suspension system according to claim 1, wherein said gas-barrier film is formed of an ethylene-vinyl alcohol copolymer or a polyamide.

3. The suspension system according to claim 1, wherein said gas-barrier film is formed of a high-molecular compound containing any one of substances including polyvinyl chloride, polyvinylidene chloride, and acrylonitrile.

4. The suspension system according to claim 1, wherein said elastomer body is formed of a material selected among a group of materials including a polyurethane elastomer, a polyester elastomer, and a polyamide elastomer.

5. The suspension system according to claim 1, wherein said rod is hollow, and said bellows is contained therein.

6. The suspension system according to claim 5, wherein said gas chamber and said oil chamber are defined inside and outside the bellows, respectively.

7. The suspension system according to claim 6, wherein said oil chamber is provided with a stopper having an oil passage port, and said bellows is provided with a lid facing the passage port of the stopper, being fitted in the passage port in a liquid-tight manner when the bellows extends to a predetermined length.

8. The suspension system according to claim 1, wherein said cylinder housing includes a first cylinder housing in which the rod is fitted, and a second cylinder housing connecting with the first cylinder housing and containing the oil and gas chambers therein and the bellows.

9. The suspension system according to claim 8, wherein said oil chamber and said gas chamber are defined inside and outside the bellows, respectively.

10. The suspension system according to claim 9, wherein said oil chamber is provided with a stopper having an oil passage port, and said bellows is provided with a lid facing the passage port of the stopper, being fitted in the passage port in a liquid-tight manner when the bellows contracts to a predetermined length.

11. The suspension system according to claim 8, wherein said oil chamber and said gas chamber are defined outside and inside the bellows, respectively.

12. The suspension system according to claim 1, wherein said bellows is formed by blow-molding.

13. The suspension system according to claim 1, wherein said gas chamber contains a suitable quantity of liquid for adjusting the capacity of the gas chamber., 14. The suspension system according to claim 1, further comprising a hydraulic unit connected to the cylinder assembly, for delivering the oil from or into the oil chamber.

* * * * *

UNITED STATES PATENT AND TRADEMARK OFFICE
CERTIFICATE OF CORRECTION

PATENT NO. : 4,890,822

DATED : January 2, 1990

INVENTOR(S) : EZURE et al

It is certified that error appears in the above-identified patent and that said Letters Patent is hereby corrected as shown below:

In the title page, change the third inventor's address "Yok<u>a</u>hama" to --Yokohama--.

Signed and Sealed this

Fourth Day of June, 1991

*Attest:*

HARRY F. MANBECK, JR.

*Attesting Officer*　　*Commissioner of Patents and Trademarks*